3,197,438
Patented July 27, 1965

3,197,438
POLYMERIZATION AND CO-POLYMERIZATION OF TRIOXANE IN INERT SOLVENTS
Louis L. Wood, Jr., Clarksville, Md., assignor to W. R. Grace & Co., New York, N.Y., a corporation of Connecticut
No Drawing. Filed Oct. 20, 1961, Ser. No. 146,414
6 Claims. (Cl. 260—67)

This application is a continuation-in-part of my application Serial No. 82,675, filed January 16, 1961, now abandoned.

This invention relates to the production of polyoxymethylene and copolymers of polyoxymethylene and epoxides which can be easily adapted to continuous plant production. More particularly the invention relates to a process for the polymerization of trioxane-copolymer systems in the presence of controlled amounts of solvent.

It is known that trioxane polymerizes in the presence of certain catalytic materials to produce tough high molecular weight polymers and that the polymerization process is almost instantaneous when certain catalysts are used. It has also been shown that superior polymers can be prepared by the copolymerization of trioxane with certain epoxides in the presence of suitable catalysts.

Heretofore in order to obtain useful high molecular weight polymers or copolymers of trioxane the polymerizations were carried out in the presence of little or no solvent. The products of these reactions were obtained as a bulky mass which had to be pulverized before they could be processed further to improve their properties. To avoid bulk polymerization reactions of this type, it is most desirable to keep the polymer dispersed in a solution of the monomers in an inert solvent during polymerization.

I have found that a good yield of a finely divided trioxane polymer or copolymer of trioxane and certain epoxides can be prepared in a solvent system. The polymerization can be carried out rapidly in an inert solvent in which trioxane and a comonomer are soluble to give good yields of finely divided high molecular weight polymers. The process comprises initiating the polymerization in the presence of a minimum amount of solvent or no solvent at all. After a suitable induction period, polymer begins to precipitate and small amounts of solvent are added as frequently as required to keep the polymer particles in suspension.

The preferred method of carrying out the reaction comprises rapidly stirring liquid trioxane or a solution of trioxane and an epoxide containing little or no inert solvent with one of the usual cationic catalysts such as boron trifluoride etherate, trialkyl oxonium fluoborate, etc. As the amount of the fine particles increases to the point where rapid stirring becomes difficult a sufficient amount of the inert solvent is added to facilitate the stirring. Periodically it is necessary to repeat the addition of sufficient quantities of inert solvent in order to maintain stirring and complete suspension of this increasing amount of finely divided polymer. After the reaction is complete the products are separated, washed and, if desired, treated to improve their stability or film forming properties.

The function of the solvent is to keep the reactants in suspension during the polymerization. Ideally, the polymerization is started in the absence of a solvent and as the reaction progresses, only sufficient solvent is added to maintain reactants in suspension. However, on a small scale, a reasonably good product can be obtained when a quantity of solvent equal to $\frac{1}{10}$ to $\frac{1}{7}$ of the number of moles of molten trioxane present is added initially. When the reaction is run on a larger scale, up to $\frac{1}{4}$ of the number of moles of trioxane present as the solvent can be tolerated. During the polymerization, a sufficient amount of solvent is added to keep the particles in suspension. This addition is preferentially made incrementally.

The polymers of my invention are defined as having a certain minimum degree of "toughness." Degree of toughness is determined by subjecting a film 3 to 8 mils in thickness to a series of manual creasing actions. A single crease cycle consists of folding the film through 180° and creasing and then folding in the reverse direction through 360° and creasing. The number of creasing cycles the film withstands before breaking is known as the degree of "toughness." Thus, a film that cannot stand one complete cycle has a degree of toughness of 0. If it breaks on the sixth cycle, for example, it has a degree of toughness of 5.

The viscosity of the polymers was measured at 140° C. ±0.3 using the following techniques. The viscosity measurements depend on determination of the proper combination of solvent, stabilizers and temperature. Viscosity measurements can be made at any reasonable time before the polymer degrades significantly. It was found that benzyl alcohol which boils above 200° C. readily dissolves the polyoxymethylene polymers and copolymers and that our products were stable in the solvent for at least 30 minutes providing a small amount of base and an anti-oxidant were present. The solvent for both the polymer and the blank consisted of 0.05 gram of an organic base N,N,N',N'-tetra kis (2 hydroxypropyl)-ethylenediamine and 1.0 gram of diphenylamine dissolved in 94.56 grams of benzyl alcohol (100 ml. of benzyl alcohol at 140° C. weigh 94.56 grams). The viscometer tubes were cleaned with hot acetic acid followed by a thorough washing with water, ammonium hydroxide, and distilled water. The dried tube was then rinsed with hot benzyl alcohol blank solution. The running time for the blank solution was then determined until 4 or 5 successive readings did not vary more than 0.2 second in a running time of 148–200 seconds.

Several 0.150 gram samples of the well-dried polymer were dissolved in the standard benzyl alcohol solution by heating the well-stirred mixture at 170–190° C. for 5–10 minutes in an oil bath. The viscometer was rinsed directly with hot polymer solution and then the running time of the solution was determined until 4 or 5 successive readings did not vary more than 0.2 second. Less than 30 minutes elapsed between the time the polymer was heated to 160–170° C. and the final viscosity measured.

My preferred method for the preparation of these polymers comprises adding freshly distilled trioxane to a suitable reaction vessel heated to a temperature above the melting point of trioxane. It may be desirable to add a very small amount of solvent at this point. The reaction is started and allowed to proceed until polymerization is occurring rapidly and difficulty is encountered in stirring. At the end of this period, an amount of an inert solvent is added which is sufficient to eliminate the stirring difficulties. This incremental addition is continued until the reaction is substantially complete.

Since the polymers are finely divided they are readily isolated at this point and are washed with an inert solvent heated to about 60–80° C. After washing, the polymer is separated by filtration to remove the solvent.

Suitable catalysts for the reaction include almost any cationic catalyst. Examples are inorganic fluorides; such as boron trifluoride etherate, boron trifluoride, antimony trifluoride, antimony fluoborate, bismuth trifluoride, bismuth oxyfluoride, nickelous fluoride, aluminum trifluoride, titanium tetrafluoride, etc.; salts such as those alkoxy oxonium compounds having the empirical formula

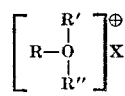

where R, R', and R'' may be alkyl, cycloalkyl, etc., R, R', and R'' may be part of the same alkyl chain or may be different groups and X may be $BF_4^\ominus$, $SbCl_6^\ominus$, $FeCl_4^\ominus$, etc. Examples of these oxonium salts include trimethyl, triethyl, tri-n-propyloxonium fluoborate; methyl tetramethyleneoxonium fluoborate; ethyl pentamethyleneoxonium fluoborate; the oxonium salts of dimethypyrone and camphor; the oxonium salts of other metal halides such as oxonium salts of iron, antimony or tin such as trialkyl oxonium hexachloroantimonate, trialkyl oxonium tetrachloroferrate, etc.

The concentration of the catalyst is extremely important since the rate of the reaction is dependent on catalyst concentration. Different types of catalysts require different concentrations. Where an extremely rapid catalyst, such as boron trifluoride etherate is used, the catalyst concentration must be kept within the range of about $6.5 \times 10^{-5}$ to $22 \times 10^{-5}$ moles of catalyst per mole of trioxane present in the reaction vessel, the preferred range being $6.5 \times 10^{-5}$ to $10 \times 10^{-5}$ moles of catalyst per mole of trioxane. When the oxonium salts are used as catalysts the catalyst concentration must be kept within the range of about $10^{-6}$ to $10^{-4}$ moles of catalyst per mole of trioxane, the preferred range being $1 \times 10^{-5}$ to $9 \times 10^{-5}$ moles of catalyst per mole of trioxane. In general, the most satisfactory product is obtained when the catalyst is present in concentrations of about $3 \times 10^{-5}$ to $7 \times 10^{-5}$ moles of catalyst per mole of trioxane.

It is convenient to carry out the reaction at a temperature between the melting point and boiling point of trioxane and at or near atmospheric pressure. Thus the polymerization of trioxane alone or with an epoxide may be carried out at a temperature between 20–130° C. Best results are obtained at a temperature of about 60–80° C. when a copolymer is being formed because although propylene oxide, for example, which boils at 35° C., is soluble in trioxane up to about 2%, it would obviously tend to boil out of the solution at increased temperatures unless the reaction were run at a pressure slightly above atmospheric.

Pressure is not critical but, for reasons of economy and ease of operation, I prefer to carry out the polymerization reaction at nearly atmospheric pressure wherever possible. In cases where the epoxide to be polymerized with trioxane has a boiling point below the reaction temperature, the reaction would obviously be run under pressure. The minimum pressure would be determined by the vapor pressure of the monomer solution and the temperature chosen for the polymerization.

The polymerization time may vary over a wide range, dependent on the type of polymerization being carried out. The copolymerization of epoxides and trioxane is normally complete in about one to six hours; the polymerization of trioxane alone is about 0.5 to 3 hours. Longer time may be employed, if desired.

Various epoxides may be used in preparing the copolymers using my novel process. The preferred group is those epoxides having the general formula

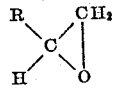

where R is substituted on unsubstituted alkyl, aryl, aralkyl, alkaryl, or cycloalkyl groups, the substituents being a halogen atom or an epoxy, cyano, nitro, carbalkaryl, and ether groups. Examples of such compounds include propylene oxide and epichlorohydrin. The ratio by weight of trioxane of the epoxide is preferably between 92–8 and 99.5–0.5.

Any inert solvent may be used in my novel process. Suitable solvents include aromatic hydrocarbons having six to ten carbon atoms such as benzene, chlorobenzene, nitrobenzene, etc.; cycloaliphatic hydrocarbons having five to ten carbon atoms such as cyclohexane, cyclopentane, cycloheptane, cyclooctane, etc.; aliphatic compounds having five to ten carbon atoms such as pentane, heptane, hexane, etc.

My invention is further illustrated by the following specific but non-limiting examples.

EXAMPLE I

A quantity of commercial trioxane was purified by refluxing under nitrogen and over calcium hydride. The portion of this material which distilled first was discarded and a center cut was stored under nitrogen for use in preparing the polymers of my invention.

A charge of 220 g. of this specially distilled trioxane was transferred to a resin kettle equipped with a stirrer, dropping funnel and an air condenser. The temperature was increased to 70° C. A 22 ml. portion of dry cyclohexane was added along with 5.5 g. of epichlorohydrin and $6.5 \times 10^{-5}$ moles of boron trifluoride etherate per mole of trioxane as a catalyst—the molten trioxane being stirred rapidly throughout. After five minutes the reaction mixture had become quite thick. Periodically over a 3 hour period an additional 85 ml. of cyclohexane was added in 10 and 25 ml. increments as needed to facilitate stirring. The reaction was continued for a period of three hours at which time the particles of polymer were collected by filtration, washed free of cyclohexane, unreacted trioxane and epichlorohydrin with two 250 ml. portions of hot acetone. The polymer was dried for 30 minutes at 50° C. under vacuum. A yield of 117.4 grams (54%) of fine white material which passed easily through a 200 mesh screen was recovered. The polymer had a specific reduced viscosity of 0.56 deciliter per gram.

EXAMPLE II

Another run was completed using the same techniques as in Example I.

A charge of 224 grams of freshly distilled trioxane was transferred to a resin kettle equipped with a stirrer, an air condenser, and a dropping funnel. A total of 5.6 grams of epichlorohydrin and $6.5 \times 10^{-5}$ moles of boron trifluoride etherate catalyst per mole of trioxane were added along with 100 ml. of dry cyclohexane. The mixture was stirred rapidly at 70° C. under an atmosphere of nitrogen. After approximately 40 seconds the solution became turbid. Periodically over a 3 hour period an additional 85 ml. of cyclohexane was added in 10 and 25 ml. increments as needed to facilitate stirring. At the end of three hours and 10 minutes, the reaction was stopped and the product removed from the resin kettle, filtered, washed with hot acetone and cooled to 18° C. for approximately 20 hours. The material was then dried at 60° C. in vacuo for four hours. A total of 13.55 grams of the product was recovered for a yield of 61%. The reduced specific viscosity of the polymer was 0.67 deciliters per gram.

EXAMPLE III

The deleterious effect of excess solvent in the initial phase of the reaction was demonstrated in a run in which trioxane which had been purified as in Example I was polymerized with epichlorohydrin to form a copolymer.

A charge of 220 grams of freshly distilled trioxane was added to a resin kettle equipped with a stirrer, a dropping funnel and an air condenser. The temperature was increased to 70° C. A 100 ml. portion of dry cyclohexane was added along with 5.5 grams of epichlorohydrin and $6.5 \times 10^{-5}$ moles of $BF_3$ etherate per mole of trioxane as a catalyst. The molten trioxane was stirred rapidly during the addition of the epichlorohydrin and the catalyst. After 5 minutes, the reaction medium had become quite thick and a 50 ml. portion of dry cyclohexane was added to facilitate stirring. The reaction was continued for a period of 3 hours at which time the particles of polymer were collected by filtration, washed to remove cyclohexane, unreacted trioxane, and epichlorohydrin with 250 ml. portion of hot acetone. The polymer was treated for 30 minutes at 50° C. under vacuum. A yield of 158 grams (71.8% of fine white material) which would pass through a 200 mesh screen was recovered. The reduced specific viscosity of the material was determined and found to be only 0.35. The reduced specific viscosity is a measurement of the molecular weight of the polymer. Experimental evidence indicates that a polymer must have a reduced specific viscosity of at least 0.50 to be a satisfactory polymer. It is apparent from this example that adding approximately 1 mole of cyclohexane per mole of trioxane initially gives a product that has undesirable properties.

EXAMPLE IV

The importance of having a small amount of the solvent present initially was emphasized in the run in which 0.41 mole of cyclohexane per mole of trioxane was added initially. The results were essentially the same as Example III above.

In this run, a charge of 252 grams of trioxane which had been freshly distilled using the techniques described above was transferred to a resin kettle, equipped with a stirrer, an air condenser, and a dropping funnel. A total of 6.3 grams of epichlorohydrin and $6.5 \times 10^{-5}$ moles of boron trifluoride etherate per mole of trioxane was added along with 125 ml. of cyclohexane (0.41 mole of cyclohexane per mole of trioxane). The mixture was stirred rapidly at 70° C. under an atmosphere of nitrogen. After approximately 4 minutes, the solution became turbid. After 25 minutes, 25 ml. of dry cyclohexane was added to decrease the viscosity of the reaction mixture. Other 25 ml. portions of cyclohexane were added to promote easy stirring periodically over a 3 hour period. At the end of 3 hours, a total of 300 ml. of cyclohexane had been added to the reaction mixture. At the end of 3 hours and 10 minutes, the reaction was stopped and the reactants removed from the resin kettle, filtered, washed with hot acetone and cooled at 18° C. for approximately 20 hours. The material was then dried at 60° C. in vacuo for 4 hours. A yield of 20% was recovered. The reduced specific viscosity of this material was only 0.16. The material melted at 150–155° C. which is much lower melting than the better material. A product with a reduced specific viscosity of approximately 0.80, for example, had a melting point of 167–170° C.

EXAMPLE V

A different method of drying the trioxane was used and the dried product polymerized using the same technique as in the run described in Example II. In this run the trioxane was distilled from lithium aluminum hydride-triethyl aluminum mixture and then the product was used as a material in the run.

A charge of 177 grams of this trioxane, 4.4 grams of epichlorohydrin and $6.5 \times 10^{-5}$ moles of $BF_3$ etherate per mole of trioxane were added to a resin kettle along with 17 ml. of cyclohexane. The mixture was heated to 70° C. under an atmosphere of nitrogen. The polymerization began after approximately 1 minute. Additional cyclohexane was then added incrementally 1 minute, 10 minutes, and 160 minutes after start of the reaction. A total of 48 additional ml. of cyclohexane was added over this period. The reaction was stopped after 3 hours and 10 minutes, and the mixture diluted with 100 ml. of acetone, filtered, washed with hot acetone and refrigerated at approximately 18° C. The product was dried in vacuo at approximately 60° C. for 4 hours. A 45% yield of the product was recovered. The reduced specific viscosity of this polymer material was 0.74 deciliters per gram.

EXAMPLE VI

The advantage of adding cyclohexane in small amounts throughout the duration of the particle-form polymerization instead of all at once was emphasized in two runs in which the conditions were exactly the same except that in one run the solvent was added all at once and in the other run the solvent was added incrementally.

In these runs, molten crude trioxane was filtered free of solid impurities, partially crystallized, and the mother liquor decanted. The crystals were distilled through an Oldershaw column for immediate use in the following two copolymerizations which were run concurrently.

In these two runs, 200 grams batches of the purified trioxane containing 2.5% epichlorohydrin and the various amounts of cyclohexane listed below were initiated with $6.5 \times 10^{-5}$ moles of boron trifluoride diethyletherate per mole of trioxane. Both reactions were run for 3 hours at 70° C. with continuous stirring in a dry nitrogen atmosphere. The resultant free flowing particle-form copolymers were washed twice with hot acetone and dried under reduced pressure at 60–80° for several hours. The comparative results of these two runs is shown in Table I below:

*Table I*

| Amount of cyclohexane and mode of addition. | 0.5 mole cyclohexane per mole of trioxane all added initially. | 0.1 mole of cyclohexane per mole of trioxane added initially. 0.4 mole cyclohexane per mole trioxane added in small portions throughout the 3 hr. polymerization to maintain particle suspension. |
|---|---|---|
| Yield of copolymer | 45% | 51%. |
| $N_{sp/c}$ (g./deciliters) | 0.46 | 0.65 |

It is apparent from comparison of the two runs that the material with the suitable reduced specific viscosity can be obtained only using the incremental addition. The yield in the run where the solvent was added incrementally was also better than the yield in the run in which all of the trioxane was added initially.

EXAMPLE VII

In another run the trioxane was polymerized with epichlorohydrin using the same techniques as set out above except that the $BF_3$ etherate was added directly rather than as a solution of $BF_3$ etherate in nitrobenzene. In this run 209 grams of trioxane, 5.2 grams of epichlorohydrin, 20 ml. of cyclohexane or 1/10 mole of cyclohexane per mole of trioxane were added to a resin kettle as in the previous run. A charge of $6.5 \times 10^{-5}$ moles of $BF_3$ per mole of trioxane was added. The solution was stirred as before. The temperature was increased to 70° C. in an atmosphere of nitrogen. After 3 minutes an additional 30 ml. of cyclohexane was added. Other additions were made as follows: 8 ml. was added after 8 minutes, 7 ml. after 12 minutes, and 5 ml. portions after 30, 63, and 125 minutes. The run was continued for a period of 3 hours and 5 minutes. At the end of this time, the product was washed, dried and cooled as before. A yield of 50% of product was recovered. The reduced specific viscosity of this product was 0.80. The melting point of the product was 167–170° C.

It is apparent from an examination of these data that a good yield of a desirable product can be obtained when the catalyst is added without dilution with nitrobenzene.

The particle size of the product was determined using the Roller method. This method is described in detail in U.S. Bureau of Mines Technical Publication 490 published in 1931. The technique depends on Stokes law of particle fall—it involves separation of particles by means of a current of air. Very briefly, the method consists of floating definite fractions by quantitative floating of the material in the current of air of controlled velocity. The sample to be fractionated is subjected for a definite period of time to the air current until the particles of different sizes have been floated off and subsequently weighed. The particle size data is presented in the table on the following page. This data is typical of the particle distribution of the product of the process of my invention.

| Percent of particles: | Polymer size in microns |
|---|---|
| 1.0 | 10 |
| 8.8 | 10–20 |
| 5.3 | 20–40 |
| 62.8 | 40–80 |
| 13.1 | 80+ |

It is apparent from an examination of these data that a large percentage of the particles has a particle size of 40–80 microns. Only a small percentage would fall in the range termed "fines."

EXAMPLE VIII

Two additional runs were made in which the process was scaled up from laboratory scale to plant scale equipment. It was found in these runs that a satisfactory product could be obtained when the amount of cyclohexane added initially was in the ratio of 1 mole of cyclohexane per 5 moles of trioxane.

In these runs a 10 gallon stainless steel reactor was equipped with an anchor type agitator driven by a one-half horsepower air motor. Provisions were made for electrically heating the reactor. The reactor was placed on a suitable support and the reaction carried out using trioxane that had been passed through stainless steel distillation equipment. The trioxane used was distilled directly into the polymerization reactor. Two bottom outlet valves were provided for removing samples and emptying the contents of the reactor at the end of each run.

After a run was completed, acetone was added to the slurry and the polymer separated from the mother liquor in a 12 inch perforated basket centrifuge which was located near the reactor. The customary procedure for working up the reaction mixture involved adding acetone containing 1% diphenylamine or phenylnaphthalamine and filtering the thinned out slurry at about 50° C. In cases where the basket centrifuge was used, additional acetone was applied for washing the filter cake or for reslurrying and washing. The product was then evaluated using the techniques set out above. The data collected in these two runs is set out in the table below. In each of these runs, 0.01 gram of BF$_3$ etherate catalyst was added for each 100 gram of trioxane charge.

Table III.—Copolymerization of trioxane and epichlorohydrin (2.5%)

| Trioxane Charged | Cyclohexane Added, ml./per 100 g. of trioxane | | Reaction Temperature in ° C. | Yield of Polymer | | Reduced Specific Viscosity in Deciliters/g. |
|---|---|---|---|---|---|---|
| | Initial | Total | | G. | Percent | |
| 11,400 | 20 | 72 | 68 | 4,296 | 38 | 0.75 |
| 10,700 | 20 | | 59 | 5,785 | | 0.80 |

What is claimed is:
1. A process for preparing a high molecular weight polymer of trioxane having a reduced specific viscosity of at least about 0.50 and a large percentage of the particles in the 40 to 80 micron size range, which comprises the steps of:
    (a) heating trioxane to a temperature of 50 to 100° C. for a period of 1 to 24 hours,
    (b) in the presence of $1 \times 10^{-5}$ to $15 \times 10^{-5}$ moles of boron trifluoride etherate for each mole of trioxane to be polymerized, wherein said catalyst is added to the initial reactant mixture,
    (c) initiating the polymerization in the presence of a quantity of solvent equal to $\frac{1}{10}$ to $\frac{1}{7}$ mole of solvent for each mole of molten trioxane to be polymerized,
    (d) adding an additional quantity of solvent equal to up to 1 mole of solvent per 5 moles of trioxane to be polymerized in small increments over the period of the reaction and
    (e) recovering the finely divided polymer product.

2. A process for preparing a high molecular weight trioxane polymer having a reduced specific viscosity of at least about 0.50 and having a large percentage of the particles in the 40–80 micron size range, which comprises the steps of:
    (a) heating trioxane to a temperature of 50 to 100° C. for a period of 1 to 24 hours,
    (b) in the presence of $1 \times 10^{-4}$ to $1 \times 10^{-6}$ moles of an alkoxy-oxonium catalyst for every mole of trioxane to be polymerized, wherein said catalyst is added to the initial reactant mixture,
    (c) initiating the polymerization in presence of a quantity of an inert organic solvent equal to no more than 1 mole of solvent for every 5 moles of trioxane to be polymerized,
    (d) adding an additional quantity of solvent equal to 1 mole of solvent for every 5 moles of trioxane to be polymerized in small increments over the period of the reaction, and
    (e) recovering the finely divided polymer product.

3. A process for preparing a high molecular weight polymer of trioxane and an epoxide having the general formula

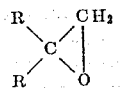

where R is selected from the group consisting of substituted and unsubstituted alkyl, aryl, aralkyl, alkaryl and cycloalkyl groups wherein said substituents are epoxy, halogen, cyano, nitro, carbalkyl and ether groups, said polymer having a reduced specific viscosity of at least about 0.50 and having a large percentage of the particles in the 40 to 80 micron size range which comprises the steps of:
    (a) heating about 92 to 99.5 parts of trioxane with about 0.5 to 8 parts of epoxide to a temperature of about 50 to 100° C. for a period of about 1 to 24 hours,
    (b) in the presence of about $1 \times 10^{-6}$ to $15 \times 10^{-6}$ moles of boron trifluoride etherate catalyst per mole of trioxane to be polymerized, wherein said catalyst is added to the initial reactant mixture,
    (c) initiating the polymerization in the presence of no more than 1 mole of an inert cycloaliphatic hydrocarbon solvent having 5 to 10 carbon atoms for every 5 moles of trioxane to be polymerized,
    (d) adding an additional quantity of solvent equal to 4 moles of solvent for every 5 moles of trioxane to be polymerized in increments as the polymerization progresses, and
    (e) recovering the finely divided polymer product.

4. A process for preparing a high molecular weight polymer of trioxane and an epoxide having the general formula:

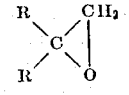

where R is selected from the group consisting of substituted and unsubstituted alkyl, aryl, aralkyl, alkaryl, and cycloalkyl groups wherein the substituents are epoxy, halogen, cyano, nitro, carbalkaryl and ether groups, said polymer having a reduced specific viscosity of at least about 0.50 and having a large percentage of the particles in the 40 to 80 micron size range which comprises the steps of:
    (a) heating about 92 to 99.5 parts of trioxane with about 0.2 to 8 parts of epoxide, at a temperature of 50 to 100° C. for a period of 1 to 5 hours, (b) in the presence of about $1 \times 10^{-5}$ moles of boron trifluoride etherate for every mole of trioxane to be polymerized, wherein said catalyst is added to the initial reactant mixture, (c) initiating the polymerization in the presence of a quantity of cyclohexane equal to $\frac{1}{7}$ mole of cyclohexane for every mole of trioxane to be polymerized, (d) adding an additional quantity of solvent equal to about $\frac{4}{7}$ mole of solvent for each mole of trioxane to be polymerized in small increments over the period of the reaction, and (e) recovering the finely divided polymer product.

5. A process for preparing a high molecular weight polymer of trioxane and an epoxide having the general formula:

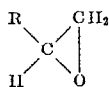

where R is selected from the group consisting of substituted and unsubstituted alkyl, aryl, aralkyl, alkaryl, and cycloalkyl wherein the substituents are epoxy, halogen, cyano, nitro, carbalkaryl and ether groups, said polymer having a reduced specific viscosity of at least about 0.50 and having a large percentage of the said particles in the 40 to 80 micron size range which comprises the steps of:

(a) heating about 92 to 99.5 parts of trioxane with about 0.5 to 8 parts of epoxide at a temperature of about 25 to 100° C. for a period of 1 to 24 hours, (b) in the presence of about $1 \times 10^{-4}$ to $1 \times 10^{-6}$ moles of an alkoxyoxonium compound having the emperical formula

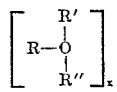

where R, R' and R'' are selected from the group consisting of alkyl and cycloalkyl groups, and where any 2 R groups may be replaced by a $(CH_2)_n$ radical, and $x$ is selected from the group consisting of $BF_4^-$, $SbCl_6^-$, and $FeCl_4^-$, for every mole of trioxane to be polymerized, wherein said catalyst is added to the initial reactant mixture.

(c) initiating the polymerization in the presence of a quantity of an inert organic solvent having 5 to 10 atoms equal to $\frac{1}{7}$ mole of solvent for every mole of trioxane to be polymerized, (d) adding an additional quantity of said solvent equal to about $\frac{4}{7}$ mole of solvent for each mole of trioxane to be polymerized in increments as the polymerization progresses, and (e) recovering the finely divided polymer product.

6. A process for preparing a high molecular weight polymer of trioxane and epichlorohydrin, having a reduced specific viscosity of at least 0.5 and a large percentage of the particles in the 40 to 80 micron size range, which comprises the steps of:

(a) heating about 92 to 99.5 parts of trioxane with about 0.5 to 8 parts of epichlorohydrin at a temperature of about 50 to 100° C. for approximately 3 hours, (b) in the presence of $3 \times 10^{-5}$ to $7 \times 10^{-5}$ moles of triethyloxonium fluoborate catalyst for each mole of trioxane to be polymerized, wherein said catalyst is added to the reactant mixture, (c) initiating the polymerization in the presence of a quantity of cyclohexane solvent equal to about $\frac{1}{7}$ mole of solvent for each mole of trioxane to be polymerized, (d) adding an additional quantity of solvent equal to about $\frac{4}{7}$ mole of cyclohexane for each mole of trioxane to be polymerized in small increments as the polymerization progresses, and (e) recovering the finely divided polymer product.

References Cited by the Examiner

UNITED STATES PATENTS

| | | | |
|---|---|---|---|
| 2,775,570 | 12/56 | Barkdoll et al. | 260—33.4 |
| 2,989,508 | 6/61 | Hudgin et al. | 260—67 |
| 3,017,389 | 1/62 | Langsdorf et al. | 260—67 |
| 3,027,352 | 3/62 | Walling et al. | 260—67 |
| 3,112,280 | 11/63 | Farthing | 260—67 |
| 3,115,480 | 12/63 | Steadman et al. | 260—67 |

FOREIGN PATENTS

| | | |
|---|---|---|
| 1,243,668 | 9/60 | France. |
| 878,163 | 9/61 | Great Britain. |

OTHER REFERENCES

Latremouille et al.: Journ. Amer. Chem. Soc., vol. 82, 120–124 (Jan. 5, 1960).

Meerwein et al.: Annalen der Chemie 566, 150–162 (1950), pages 158–160.

Worsfold et al.: Journ. Amer. Chem. Soc., vol. 79, 897–902 (Feb. 20, 1957).

WILLIAM H. SHORT, *Primary Examiner.*

LEON J. BERCOVITZ, HAROLD N. BURSTEIN,
*Examiners.*